United States Patent

[11] 3,610,980

| [72] | Inventors | Georges Astic<br>Saint-Marcel-les-Valence;<br>Jacques Vergues, Valence, both of France |
|---|---|---|
| [21] | Appl. No. | 881,116 |
| [22] | Filed | Dec. 1, 1969 |
| [45] | Patented | Oct. 5, 1971 |
| [73] | Assignee | Crouzet<br>Paris, France |
| [32] | Priority | Dec. 2, 1968 |
| [33] | | France |
| [31] | | 176470 |

[54] SINGLE-PHASE SYNCHRONOUS MOTORS WITH PERMANENT MAGNET AND PHASE-DISPLACEMENT RINGS
1 Claim, 2 Drawing Figs.

[52] U.S. Cl. .................................................. 310/172,
310/174
[51] Int. Cl. .................................................. H02h 17/10
[50] Field of Search .................................................. 310/174,
172, 187, 162, 186, 163, 181, 164, 49

[56]                References Cited
            UNITED STATES PATENTS

| 2,015,042 | 9/1935 | Reinhardt | 310/172 |
| 2,212,782 | 8/1940 | Lauffer | 310/163 |
| 2,323,035 | 6/1942 | Hansen | 310/172 |
| 3,302,046 | 1/1967 | Brandwijk | 310/162 |
| 3,330,975 | 7/1967 | Osterwalder | 310/164 |
| 3,452,228 | 6/1969 | Woolley | 310/162 |

FOREIGN PATENTS

| 1,049,119 | 11/1966 | Great Britain | 310/162 |

Primary Examiner—D. X. Sliney
Assistant Examiner—R. Skudy
Attorney—Holman & Stern ABSTRACT: A self-starting single-phase synchronous motor having phase-displacement rings and unidirectional rotation, in which a multipole magnetized rotor is housed in a stator unit constituted by two interjacent half-stators with a field coil. Each half-stator two magnetic armatures which are phase-displaced by short-circuited nonmagnetic conducting rings and each armature is provided with perpendicular strips suitably spaced over a same circumference so as to constitute main poles and auxiliary poles in uniformly spaced relation, wherein on the one hand the auxiliary poles of each half-stator pass through a first ring so as to undergo a phase displacement $\Phi'$ then through a second ring so as to undergo a phase displacement $\Phi''$ and on the other hand the auxiliary poles having opposite polarities are shunted magnetically after passing through the first rings so as to produce a magnetic leak as well as a reduction in reluctance. The respective cross sections of the rings are such that the phase displacement $\Phi'$ is substantially equal to the phase displacement $\Phi''$ and that the flux attenuation produced in the first rings is substantially equal to the flux attenuation which is produced in the second rings.

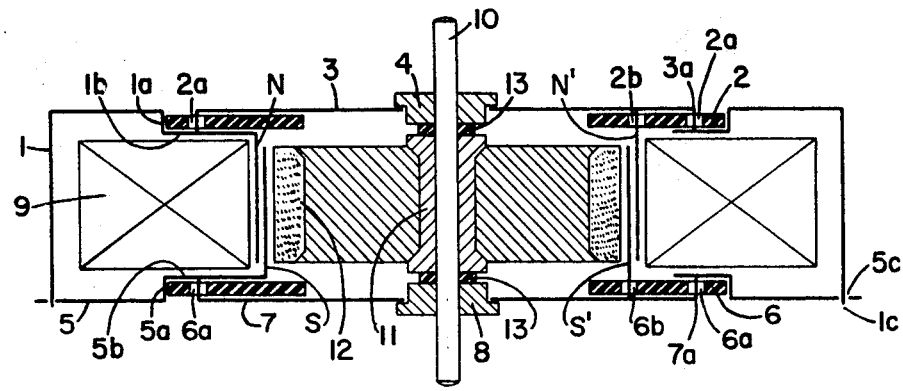
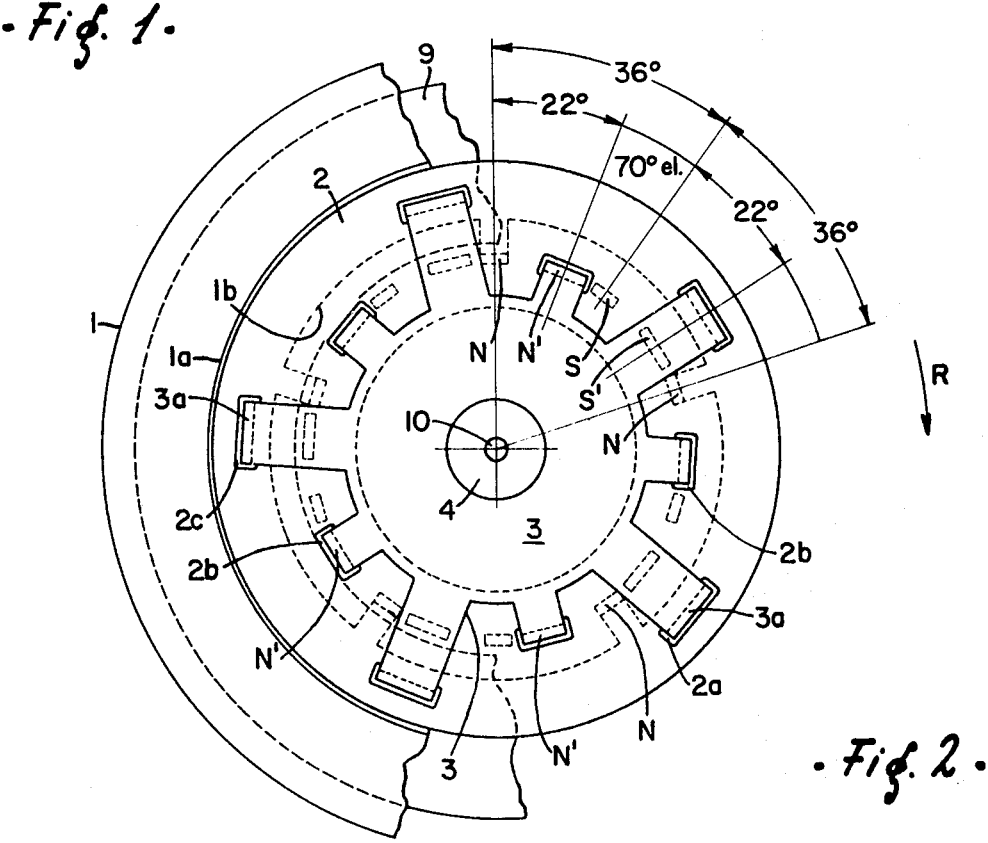
Fig. 1.
Fig. 2.
INVENTORS
GEORGES ASTIE
JACQUES VERGUES
By Holman, Glascock, Downing & Seebold
ATTORNEYS

SINGLE-PHASE SYNCHRONOUS MOTORS WITH PERMANENT MAGNET AND PHASE-DISPLACEMENT RINGS

BACKGROUND OF THE INVENTION

In self-starting single-phase synchronous motors which are already known, provision is made for a substantially constant torque and a direction of rotation which is defined by a rotating stator field, a permanent-magnetization multipole rotor being locked into a step with said field with zero slip. The stator portion of these motors usually comprises two interjacent half-stators each having two magnetic armatures whose actions are displaced in phase by means of short-circuited nonmagnetic conducting rings, each armature being additionally provided with strips at right angles to the radial plane of the motor and suitably spaced over a same circumference so as to form main poles and auxiliary poles, these latter being displaced in phase with respect to said main poles by an angular value $\Phi$.

It it known that the amplitude of the rotating field is correspondingly greater as said phase-displacement angle $\Phi$ tends towards 90° and that, in order to have a rotating field which is as uniform as possible in a given direction, the main poles and auxiliary poles must be relatively displaced through an angle $\alpha$ such that $\alpha+\Phi=180°$ (expressed in electrical degrees), $\alpha$ being counted from the main poles in the desired direction of rotation.

It is also known that a phase displacement produced by short-circuited rings increases the reluctance of the auxiliary magnetic circuit and thus produces an attenuation of flux within the corresponding poles. Inasmuch as this attenuation increases as the angle $\Phi$ increases, it is acknowledged in the present state of the art that the most satisfactory compromise is achieved by adopting a value in the vicinity of 45° in respect of $\Phi$ and by compensating to a certain extent for the reduction in flux within the auxiliary poles by providing these latter with a surface area which is larger than that of the main poles.

SUMMARY OF THE INVENTION

The single-phase ring-type synchronous motor in accordance with the invention is intended to increase the resultant torque. To this end, said motor comprises means for increasing the phase-displacement angle $\Phi$ to a value in the vicinity of 90° in respect of a flux attenuation which is distinctly lower than that which would be attained in motors of known types in which practically total flux attenuation would be observed in the case of this value of phase displacement.

The motor in accordance with the invention is characterized in that on the one hand each of the auxiliary poles of each half-stator passes through a first ring portion of a ring means so as to undergo a phase displacement $\Phi'$, then through a second ring portion of the same ring means so as to undergo a phase displacement $\Phi''$ and on the other hand the auxiliary poles having opposite polarities are shunted magnetically after passing through the first ring portions in order to produce a magnetic leak as well as a reduction in reluctance, the respective cross sections of the ring portions being such that the phase displacement $\Phi'$ is substantially equal to the phase displacement $\Phi''$ and that the flux attenuation produced in the first ring portions is substantially equal to the flux attenuation which is produced in the second ring portions.

One example of construction of the improved motor in accordance with the invention is described hereinafter and illustrated diagrammatically in the accompanying drawings, in which:

BRIEF DESCRIPTION OF THE DRAWINGS

FIG. 1 is a transverse sectional view of the motor; and
FIG. 2 is a partial plan view of the stator configuration of said motor.

For the sake of clarity of FIG. 1, the main poles and auxiliary poles are shown in the same section plane although these poles are in fact disposed in interjacent relation along a same circumference as shown in FIG. 2.

In order that the description may be more clearly understood, it will also be assumed that the upper half-stator has north polarity and that the lower half-stator has south polarity, it being understood that these polarities are reversed at each half-wave of the supply current.

DETAILED DESCRIPTION OF THE DRAWINGS

In the example of construction which is illustrated in the drawings, the motor comprises:

1. an upper half-stator which is made up of:
   a. a circular casing 1 formed of magnetic material and provided on the front face with a die-stamped and stepped zone 1b in which are cut five strips N, with said strips being uniformly spaced and bent back in a perpendicular plane so as to form five main north poles (as shown in dash lines in FIG. 2);
   b. an annular ring 2 of nonmagnetic conducting material which is inset in stamped portion 1a of the north-polarity zone 1b with which said ring is in contact. Said ring is provided along a first circumference with five large slots 2a so as to constitute five first phase-displacement zones or rings and along a second circumference with five small slots 2b so as to constitute five second phase-displacement zones or rings, with said slots 2a and 2b being uniformly arranged in alternate sequence and spaced with respect to each other as shown in FIG. 2;
   c. an auxiliary pole-piece 3 of magnetic material which is provided with a central bearing 4 of magnetically permeable material. This pole-piece comprises 10 strips which are cut out and bent back in a perpendicular plane so as to engage respectively in the slots 2a and 2b of the annular ring means 2. The five large strips 3a are adapted to engage within the slots 2a and are applied against the north-polarity armature 1b while the five small strips N' are adapted to engage within the slots 2b and form the auxiliary or phase-displaced north poles.

2. A lower half-stator which comprises:
   a. a circular cover 5 of magnetic material having a die-stamped and stepped zone 5b from which are cut five strips S in uniformly spaced relation and bent back in a perpendicular plane so as to form five main south poles (shown in chain-dotted lines in FIG. 2). This cover is provided at the periphery with cut portions 5c in which coupling flanges 1c of the casing 1 are adapted to engage in order to ensure rigid fixation of the assembly;
   b. an annular ring means 6 whose composition and configuration are identical with the ring means 2 is inset in the stamped portion 5a of the south-polarity zone 5b with which said ring is in contact;
   c. an auxiliary pole-piece 7 whose composition and configuration are identical with the pole-piece 3 so as to form five poles S' constituting the auxiliary or phase-displaced south poles. This pole-piece is also provided with a central bearing 8 of magnetically permeable material.

3. An annular induction coil 9 housed between the north-polarity and south-polarity armatures so as to produce a change of polarity in step with the frequency of the supply current.

4. A rotor formed by a shaft 10 journaled in bearings 4 and 8, a hub 11 of permeable material which is rigidly fixed to said shaft 10, a ferrite ring 12 overmolded on the hub 11 and comprising at its periphery five north poles and five south poles spaced in alternate sequence and in uniform relation along generator lines.

5. Two spacing washers 13 of nonmagnetic material placed between the bearings 4 and 8 and the hub 11 so as to materialize an airgap of constant value.

In the drawings which serve to bring out the above-mentioned characteristics, it is apparent on the one hand that the auxiliary poles N' and S' pass successively through the slots 2a and 6a the surrounding material of which constitute the first rings so as to produce a phase displacement $\Phi'$, then through slots 2b and 6b which constitute the second rings so as to undergo a phase displacement Φ″ and on the other hand that, after passing through the slots 2a and 6a, the auxiliary polepieces 3 and 7 are shunted magnetically by means of the bearings 4 and 8, the hub 11 and the airgaps as materialized by the washers 13 so as to produce a magnetic leak which substantially balances those existing between the poles N—N′ and S—S′, said leak being additionally intended to reduce the reluctance and consequently the primary flux attenuation. It is further apparent that the strips 3a and 7a have a cross section which is greater than the strips N′ and S′ so as to permit a phase displacement Φ′ which is substantially equal to the phase displacement Φ″.

It is also shown in FIG. 2 on the one hand that the main poles have a surface area which is smaller than that of the auxiliary poles in order to compensate for the flux difference existing between said poles and on the other hand that the phase-displacement angle Φ=Φ′+Φ″ in this exemplified embodiment corresponds to 70 electrical degrees, thereby permitting a geometrical displacement of 22° between main poles and auxiliary poles and a geometrical setting of 36° of the two half-stators.

The present Applicant has readily attained said phase displacement of 70° and it has been observed that the torque measurements have been very close to theoretical values, the direction of rotation R having always been unidirectional.

We claim:
1. A self-starting single-phase synchronous motor having phase-displacement rings and unidirectional rotation, comprising a multipole magnetized rotor housed in a stator unit constituted by two interjacent half-stators and additionally containing a field coil, each half-stator being such as to comprise two magnetic armatures which are phase-displaced by means of short-circuited nonmagnetic conducting rings and each armature being provided with perpendicular strips suitably spaced over a same circumference so as to constitute main poles and auxiliary poles in uniformly spaced relation, wherein on the one hand each of the auxiliary poles of each half-stator passes through a first ring of a ring means so as to undergo a first phase displacement then through a second ring of the same ring means so as to undergo a second phase displacement and on the other hand the auxiliary poles having opposite polarities are shunted magnetically after passing through the first rings so as to produce a magnetic leak as well as a reduction in reluctance, the respective cross sections of the rings being such that the phase displacement produced by the first rings is substantially equal to the phase displacement produced by the second rings and that the flux attenuation produced in said first rings should be substantially equal to the flux attenuation which is produced in said second rings.